(12) United States Patent
Sypitkowski et al.

(10) Patent No.: US 11,370,490 B2
(45) Date of Patent: Jun. 28, 2022

(54) USER INTERFACE FOR REVERSING A TRAILER WITH AUTOMATED STEERING SYSTEM

(71) Applicant: Robert Bosch GmbH, Stuttgart (DE)

(72) Inventors: Greg Sypitkowski, Farmington Hills, MI (US); James Stephen Miller, Dexter, MI (US); Gary Ward, Brighton, MI (US)

(73) Assignee: Robert Bosch GmbH, Stuttgart (DE)

( * ) Notice: Subject to any disclaimer, the term of this patent is extended or adjusted under 35 U.S.C. 154(b) by 126 days.

(21) Appl. No.: 16/640,407

(22) PCT Filed: Aug. 20, 2018

(86) PCT No.: PCT/EP2018/072377
§ 371 (c)(1),
(2) Date: Feb. 20, 2020

(87) PCT Pub. No.: WO2019/052773
PCT Pub. Date: Mar. 21, 2019

(65) Prior Publication Data
US 2020/0353969 A1 Nov. 12, 2020

Related U.S. Application Data

(60) Provisional application No. 62/557,999, filed on Sep. 13, 2017.

(51) Int. Cl.
*B62D 15/02* (2006.01)
*B62D 1/02* (2006.01)

(52) U.S. Cl.
CPC ....... *B62D 15/0275* (2013.01); *B62D 15/028* (2013.01); *B62D 1/02* (2013.01)

(58) Field of Classification Search
CPC ..... B62D 15/0275; B62D 15/028; B62D 1/02
See application file for complete search history.

(56) References Cited

U.S. PATENT DOCUMENTS 8,972,109 B2   3/2015   Lavoie et al.
9,505,434 B2   11/2016  Lavoie et al.
(Continued)

FOREIGN PATENT DOCUMENTS

DE   102005043468   3/2007
DE   102008034720   1/2010

OTHER PUBLICATIONS

PCT International Search Report for PCT/EP2018/072377.

*Primary Examiner* — Peter D Nolan
*Assistant Examiner* — Wae L Louie
(74) *Attorney, Agent, or Firm* — Kelly McGlashen; Maginot, Moore & Beck LLP

(57) ABSTRACT

A trailer reversing assist system for controlling reversing operations of a vehicle and trailer connected to the vehicle includes a module that detects an angle of the trailer relative to the vehicle, and outputs a trailer angle signal corresponding to the detected angle. The system also includes a human machine interface (HMI) device that provides an output signal based upon an input of the user, where the generated output signal includes information regarding magnitude and direction of a desired change to the angle. The system calculates a trailer trajectory that positions the trailer at a target location or calculates a trailer trajectory correction, wherein the calculation is performed using the output signal as corresponding to a change relative to the detected angle, and the detected angle corresponds to the trailer angle signal generated at the time of operation of the HMI device by the user.

15 Claims, 6 Drawing Sheets

(56) References Cited

U.S. PATENT DOCUMENTS

| | | | |
|---|---|---|---|
| 9,517,794 B2 | 12/2016 | Lavoie | |
| 10,926,796 B1* | 2/2021 | Beech | B60D 1/155 |
| 2014/0058622 A1* | 2/2014 | Trombley | B60Q 1/50 |
| | | | 701/33.2 |
| 2014/0085472 A1* | 3/2014 | Lu | B60R 1/00 |
| | | | 348/148 |
| 2014/0172232 A1* | 6/2014 | Rupp | B62D 13/06 |
| | | | 701/36 |
| 2014/0188344 A1* | 7/2014 | Lavoie | B60D 1/62 |
| | | | 701/41 |
| 2014/0210456 A1* | 7/2014 | Crossman | B60W 10/18 |
| | | | 324/207.13 |
| 2014/0218522 A1* | 8/2014 | Lavoie | G08G 1/167 |
| | | | 348/148 |
| 2015/0134183 A1 | 5/2015 | Lavoie et al. | |
| 2015/0210317 A1* | 7/2015 | Hafner | B62D 13/06 |
| | | | 701/41 |
| 2016/0288601 A1* | 10/2016 | Gehrke | B60Q 5/006 |
| 2017/0080974 A1 | 3/2017 | Lavoie | |
| 2017/0101130 A1 | 4/2017 | Lavoie | |
| 2017/0129403 A1 | 5/2017 | Lavoie | |
| 2017/0136948 A1* | 5/2017 | Sypitkowski | H04N 5/23238 |
| 2018/0081370 A1* | 3/2018 | Miller | B60D 1/62 |
| 2019/0061817 A1* | 2/2019 | Mattern | B62D 15/0285 |
| 2019/0064837 A1* | 2/2019 | Miller | B62D 15/0285 |
| 2019/0135059 A1* | 5/2019 | Niewiadomski | B62D 15/028 |
| 2019/0230282 A1* | 7/2019 | Sypitkowski | B60R 1/00 |
| 2019/0375450 A1* | 12/2019 | Medagoda | B62D 15/0285 |
| 2020/0019182 A1* | 1/2020 | Ling | B60D 1/62 |
| 2020/0086702 A1* | 3/2020 | Ling | B62D 15/0285 |
| 2020/0101897 A1* | 4/2020 | Miller | B60W 30/18036 |
| 2020/0148257 A1* | 5/2020 | Niewiadomski | B62D 13/06 |
| 2020/0207333 A1* | 7/2020 | Miller | G01C 21/3602 |
| 2020/0238771 A1* | 7/2020 | Niewiadomski | B60D 1/06 |
| 2020/0269852 A1* | 8/2020 | Miller | G06T 7/70 |
| 2020/0353969 A1* | 11/2020 | Sypitkowski | B62D 15/028 |
| 2021/0061354 A1* | 3/2021 | Niewiadomski | B60W 10/18 |
| 2021/0070357 A1* | 3/2021 | Niewiadomski | G05D 1/0225 |
| 2021/0171098 A1* | 6/2021 | Beech | B62D 13/04 |

* cited by examiner

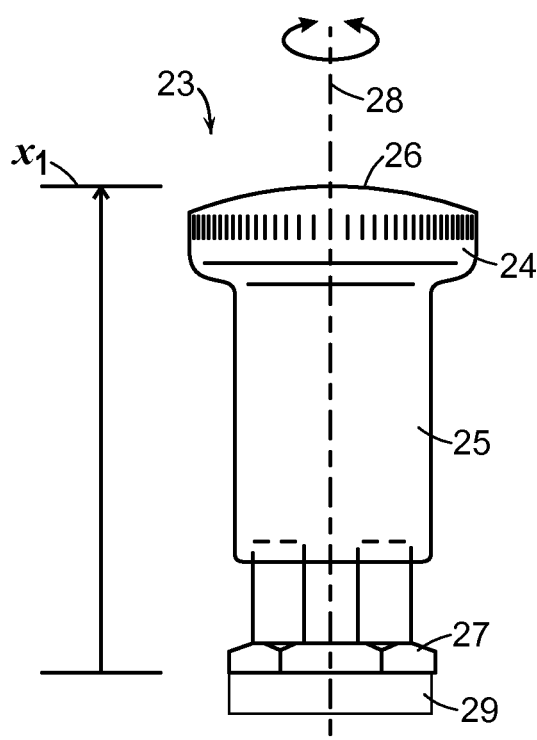 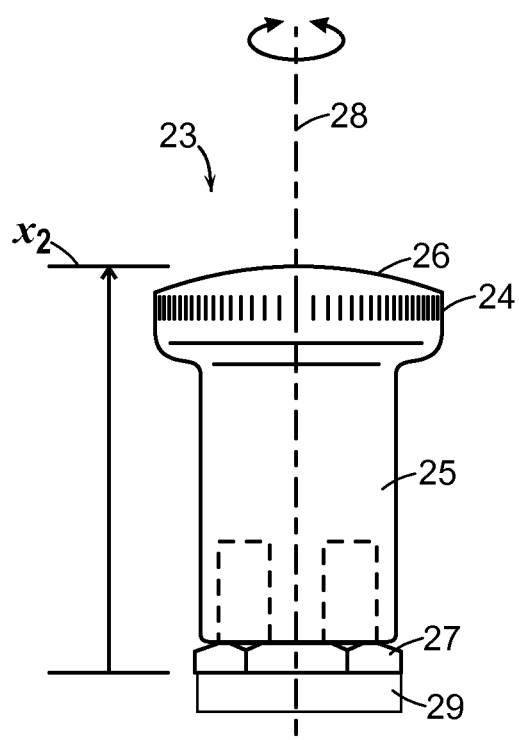
FIG. 3     FIG. 4
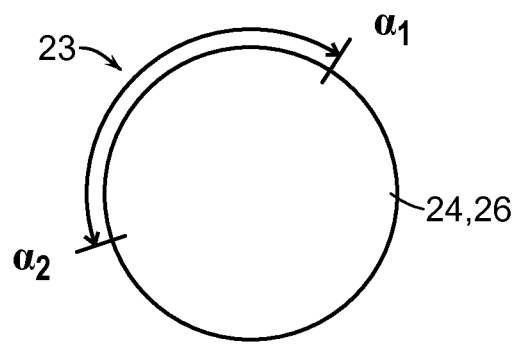
FIG. 5

USER INTERFACE FOR REVERSING A TRAILER WITH AUTOMATED STEERING SYSTEM

This application is a 35 U.S.C. § 371 National Stage Application of PCT/EP2018/072377, filed on Aug. 20, 2018, which claims priority to U.S. provisional patent application number 62/557,999, filed on Sep. 13, 2017, the disclosures of which are incorporated herein by reference in their entirety.

FIELD

Embodiments of the invention relate to automated vehicle control systems, and particularly to a trailer reversing assist system for controlling reversing operations of a vehicle and trailer connected to the vehicle.

BACKGROUND

Reversing a vehicle with a trailer attached can be a difficult maneuver for many people. There are many reasons for this difficulty. For example, during the reversing operation, there is a need to counter-steer the vehicle relative to the desired direction for the trailer, which is often counter-intuitive. In addition, many operators lack sufficient familiarity with the reversing operation to know how much steering to apply to achieve a given trailer motion. Further, the reversing operation often requires multiple fine corrections for backing up straight with a trailer. Still further, there is a danger of steering trailer while reversing to such a large angle relative to the vehicle that it is no longer possible to steer the trailer back to alignment with the vehicle while reversing (referred to as jack-knifing the trailer).

Multiple vehicle driving assist systems have been proposed and developed to automatically control the steering when reversing with a trailer in response to a desired trailer angle input by the driver. These systems often have a method of measuring the angle between the trailer and the vehicle, controlling the vehicle steering; and selecting a desired trailer angle based on a user input.

However, reversing a trailer with such vehicle driving assist systems can still require practice by the user to become familiar with inputting the desired trailer angle and achieving the desired trailer trajectory, and are often associated with the same challenges described above for unassisted reversing operations. This can lead to over-steering of the vehicle and trailer and require pulling the vehicle forward again to get the desired alignment of the trailer.

SUMMARY

In some aspects, a trailer reversing assist system for controlling reversing operations of a vehicle and trailer connected to the vehicle is provided. The system addresses the above described difficulties and improves the user experience. In the trailer reversing assist system, a user input of the desired trailer angle is converted to a vehicle steering response. In addition, the system includes the ability for the user to dynamically update the trailer angle, and also may include one or more of the following additional elements:

The ability to set a desired trailer trajectory based on a fixed trailer angle relative to the vehicle. This would produce motion in a fixed radius of curvature.

The ability to set a target trailer path based on a fixed angle of the trailer relative to a direction on the ground. This would steer the trailer to the aligned direction on the ground and also align the vehicle with the trailer along the same path.

The ability to set a desired end position and trailer orientation at some position on the ground. This would drive the vehicle and trailer to achieve that position and orientation.

The ability to quickly set the desired trailer direction to be the current direction. This is useful when dynamically steering the trailer, and when it has achieved a desired direction, to then align the vehicle and trailer along that direction.

The ability to limit the speed of the vehicle to avoid quickly arriving at a jack-knife position.

The ability to automatically set the sensitivity of the user input (the mapping of input motion to desired trailer angle) based on the ease of jack-knifing the trailer. For example, shorter trailers have a smaller jack-knife angle. So the maximum range of user input could map to this smaller jack-knife angle as compared to the angle range which would be allowed for a longer trailer.

Similarly, at higher speeds the sensitivity of the user input to trailer angle would be less, since at higher speeds, the time to jack-knife the trailer is shorter.

The ability to limit the selected trailer angle to avoid the jack-knife condition, but allow for an override to go past the jack-knife angle based on an additional user input or action.

In some aspects, the trailer reversing assist system includes a controller that communicates with a vehicle power steering assist system, a trailer angle detection system that detects an angle of the trailer relative to the vehicle, a vehicle environment imaging system that may include vehicle cameras and/or imaging sensors, and other vehicle systems such as braking control and powertrain control. The trailer reversing assist system also includes a human machine interface (HMI) device that allows a user to interact with the system including providing an input to the system, and a display device within the vehicle that displays images generated by the vehicle environment imaging system as well as information provided by the trailer reversing assist system.

In one embodiment, the system includes a trailer angle detection module that detects an angle of the trailer relative to the vehicle, and outputs a trailer angle signal corresponding to the detected angle. The system also includes an HMI device that provides an interface between a vehicle operator and the system. The HMI device provides an output signal based upon an operation of the HMI device by the user, where the generated output signal includes information regarding a magnitude and a direction of the operation of the HMI device by the user. In addition, the output signal corresponds to at least one of a desired target trajectory and desired trailer trajectory correction. The system includes a controller that receives as inputs the output signal and the trailer angle signal generated at the time of operation of the HMI device by the user. The controller performs at least one of a) a calculation of a trailer trajectory that positions the trailer at a target location and b) a calculation of a trailer trajectory correction. The calculation is performed using the output signal as corresponding to a change relative to the detected angle, and the detected angle corresponds to the trailer angle signal generated at the time of operation of the HMI device by the user. In addition, the controller controls a steering angle of the vehicle and an engine of the vehicle to position the trailer at the target location based on the trailer trajectory.

The trailer reversing assist system, including the HMI device alone or in combination with one or more interface features described herein, provides an intuitive, easily used system that minimizes the need for system familiarity, avoids over-steering, and allows for easy lock-in of a target trailer trajectory once it has been achieved.

Other aspects and embodiments of the invention will become apparent by consideration of the detailed description and accompanying drawings.

BRIEF DESCRIPTION OF THE DRAWINGS

FIG. 3 is a side view of a knob in a first axial position.

FIG. 4 is a side view of the knob of FIG. 3 in a second axial position.

FIG. 5 is a top plan view of the knob of FIG. 3.

DETAILED DESCRIPTION

Figure 1:
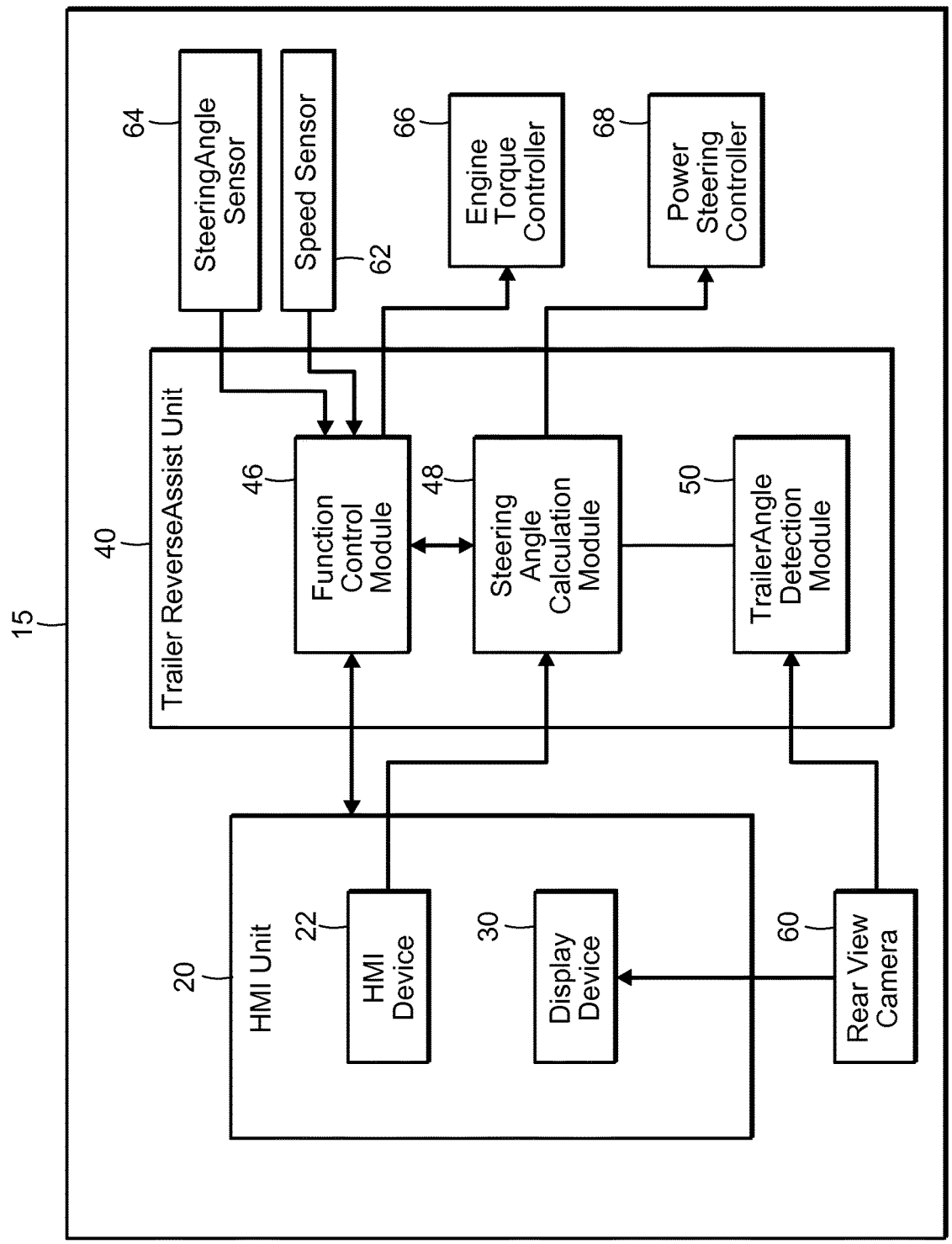
FIG. 1 is a schematic diagram of a trailer reversing assist system according to one embodiment.
Figure 2:
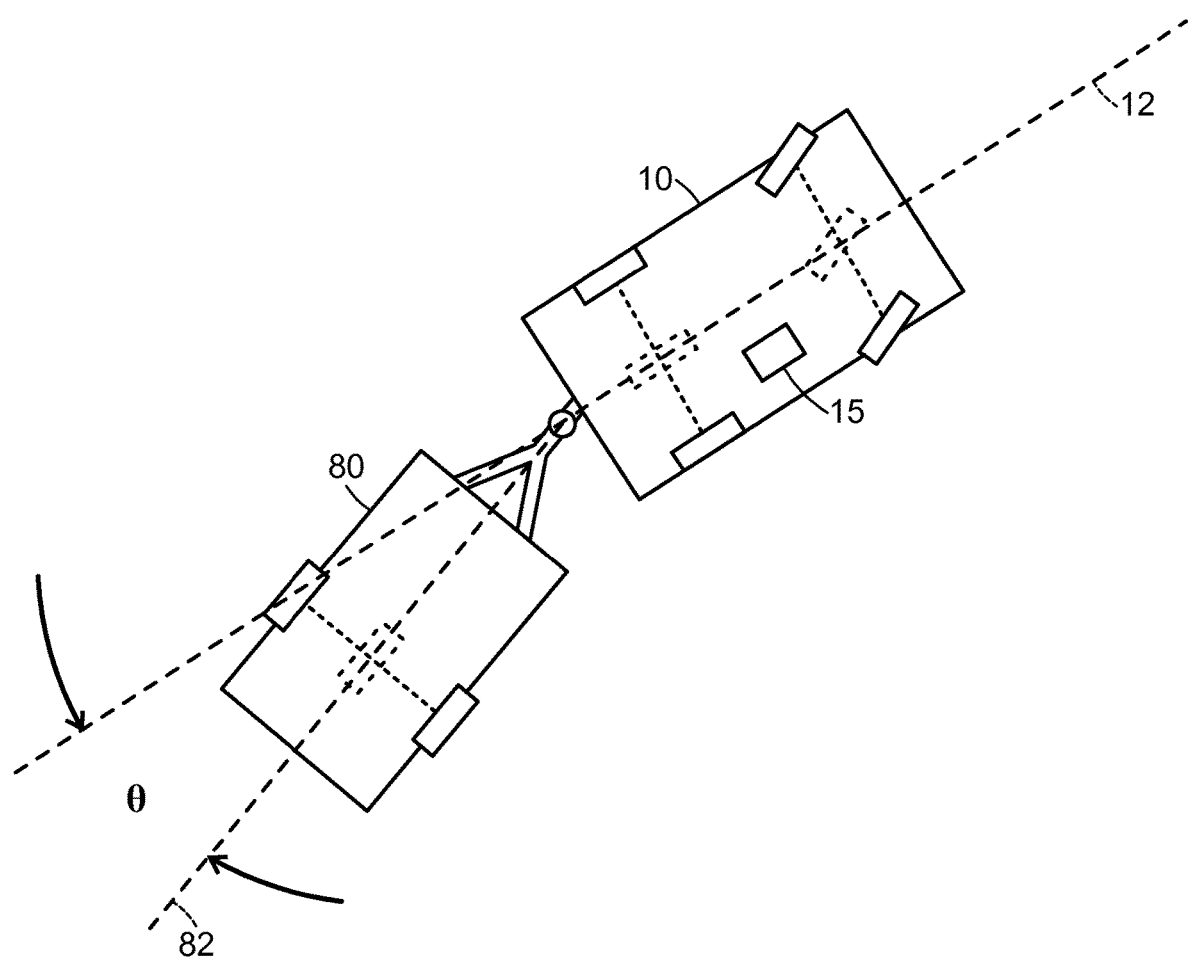
FIG. 2 is a schematic top view of the vehicle and the trailer coupled to the vehicle, illustrating the angle θ between the vehicle and the trailer.

Referring to FIGS. 1 and 2, a vehicle 10 is coupled to a trailer 80, and is equipped with a trailer reversing assist system 15 for controlling reversing operations of the vehicle 10 and the trailer 80. The trailer reversing assist system 15 includes a trailer reversing assist unit 40 that converts a user input of a desired trailer angle into a vehicle steering response, and includes modules 46, 48, 50 that communicate with various vehicle systems and devices such as a vehicle camera 60, speed and steering angle sensors, 62, 64, an engine torque controller 66, a power steering controller 68, etc., in order to evaluate a current status of the vehicle 10 and the trailer 80, and to control the movement of the vehicle and the trailer 80, as discussed in detail below. The trailer reversing assist system 15 also includes a human machine interface (HMI) unit 20 that provides an interface through which a user interfaces with the trailer reversing assist system 15. The HMI unit 20 includes a HMI device 22 that permits a user to input direction controls into the trailer reversing assist unit 40, and a display device 30 that permits the user to receive information (e.g., text, images, video, graphics including overlays, etc.) from the trailer reversing assist unit 40. For example, the user may use the HMI device 22 to input a target trailer trajectory, a target end location for the trailer, etc. In addition, during a reversing operation, the user may use the HMI device 22 to input trajectory corrections based on observation of the trajectory using the display device 30. Such corrections are considered to be "dynamic" since the trailer angle can be corrected and/or updated during the reversing operation. The HMI device 22 and the display device 30 will be described in detail below.

The trailer reversing assist unit 15 includes a function control module 46, a steering angle calculation module 48 and a trailer angle detection module 50, which communicate with vehicle systems and devices in order to evaluate a current status of the vehicle 10 and the trailer 80, and to control the movement of the vehicle and the trailer 80.

The function control module 46 is a controller that controls and implements the various functions provided by the trailer reversing assist unit 15. The function control module 46 may include dedicated processing circuitry including an electronic processor and memory for receiving data, processing data, and transmitting data. The function control module 46 is configured to receive inputs from the HMI unit 20, the steering angle calculation module 48 and vehicle sensors such as the vehicle speed sensor 62 and the steering angle sensor 64. Based on these inputs, the function control module 46 provides output to appropriate automated control systems within the vehicle, including the steering angle calculation module 48 and the engine torque controller 66. Other control systems that may be appropriate in certain circumstances include, for example, automated braking control (not shown), automated speed control (not shown), and the like. Each of the vehicle control systems may have a dedicated or shared control unit separate from the trailer reversing assist unit 15. The trailer reversing assist unit 15 may send control signals to the vehicle control systems to induce performance of an automated driving maneuver. For example, the vehicle control systems may implement the functions necessary to perform automated parking, automated trailer alignment, and the like.

The steering angle calculation module 48 is a controller that calculates a steering angle of the vehicle 10 that will provide the desired trajectory of the trailer 80 during a reversing operation. The steering angle calculation module 48 may include dedicated processing circuitry including an electronic processor and memory for receiving data, processing data, and transmitting data. The steering angle calculation module 48 is configured to receive inputs from the HMI device 22, the trailer angle detection module 50 and the function control module 46. Based on these inputs, the steering angle calculation module calculates a steering angle and outputs it to the vehicle power steering controller 68.

The trailer angle detection module 50 is a controller that detects an angle θ between the vehicle 10 and the trailer 80, where the angle θ corresponds to the angle between a longitudinal axis 12 of the vehicle 10 and a longitudinal axis 82 of the trailer 80. The trailer angle detection module may include dedicated processing circuitry including an electronic processor and memory for receiving data, processing data, and transmitting data. The trailer angle detection module 50 receives input from a vehicle environment imaging device that may include vehicle cameras including a wide angle rear view camera 60. The camera 60 may be of various constructions and types. For example, the camera 60 may be wide-panoramic camera (for example, a camera with a fisheye lens) or an omnidirectional camera that produces an omnidirectional image or near-omnidirectional image of the surroundings of the vehicle 10. In some embodiments, the camera 60 may an externally- or internally-mountable video camera, which may be configured to attach to a rear of the vehicle 10. In some embodiments, the camera is a calibrated camera that provides a registration between the image collected by the camera and world coordinates.

The camera 60 may be controlled internally and may process video or images according to hardware located internally including an electronic processor or an application specific integrated circuit (ASIC). In other embodiments, the camera 60 may capture images and transmit the raw images to the controller, which may then process the raw images produced by the camera 60. As a consequence, either the camera 60 or the controller may perform all of or some of the processing steps for image generation (i.e., image transformation, symmetry detection, shape detection, etc.).

Although in the illustrated embodiment, the trailer angle detection module employs a vehicle rear view camera, other vehicle cameras (i.e., side-view cameras), non-vehicle cameras (i.e., trailer mounted cameras, road or infrastructure mounted cameras) and/or imaging sensors such as CCD detectors, etc., or combinations thereof, may be used to determine the angle $\theta$ and/or provide an image to be displayed on the display unit 30. Based on input from the vehicle environment imaging device(s), the trailer angle detection module 50 calculates the angle $\theta$ and outputs it to the steering angle calculation module 48. In addition, the trailer angle detection module 50 provides an image, for example representing the trailer angle, to the display device 30, as discussed further below.

Communication between the modules 46, 48, 50 and the various vehicle systems and devices may be achieved using a shared communication link such as a vehicle communication bus (for example, a controller area network (CAN) bus) or vehicle network (for example, a wireless connection).

The HMI unit 20 includes the HMI device 22 and a display device 30. In the illustrated embodiments, the trailer reverse assist unit 40 may send vehicle-related information to the display device 30 and receive user-selected instructions from the HMI device 22 relating to control of the vehicle 10. The HMI unit 20 is internally located within the vehicle 10. For example, the HMI unit 20 may be integrated with a navigation system, an audio system, or various other user interfaces. In any of these above-described embodiments, the HMI unit 20 may transmit control information relating to operation of the vehicle 10 to the trailer reversing assist unit 40 including a manually selected trailer parking angle, a manually selected reversing speed, and the like.

Referring to FIGS. 3-5, in some embodiments, the HMI device 22 is a continuously rotatable knob 23. The knob includes a head 24 at a first end 26, and a stem 25 that protrudes from the head 24. A free end of the stem 25 corresponds to a second end of the knob 23. The knob includes a knob axis 28 that extends between the first end 26 and the second end 27, and is concentric with the stem 25. The knob axis 28 defines a rotational axis of the knob 23. The knob 23 includes a position sensor 29, for example an optical encoder or other suitable device, that determines a magnitude and direction of rotation of the knob 23.

The knob 23 is freely rotatable about the knob axis 28, and is not biased (i.e., spring biased) to return to any external reference location such as a neutral position or a zero angle position. This is advantageous for many reasons. In one example, the user may select an input angle corresponding to an amount of manual rotation of the knob, and then release the knob. Since the knob 23 is not biased, the knob 23 remains in the selected position (as compared to being biased to return to a neutral or zero angle position). Since the knob 23 remains in a selected position, the input to the system 15 is constant.

In some embodiments, the user inputs a desired angle change by rotation of the knob 23 about the knob axis. The output signal generated by the HMI device 22 includes information regarding a magnitude and a direction of the operation of the HMI device based on the change in position (e.g. the amount of angular rotation) of the HMI device during operation by the user. Since the HMI device is free of a reference position corresponding to a neutral position or a zero angle position, the change in position of the HMI device during operation by the user is measured relative to the immediately preceding position of the knob 23. In addition, the trailer assist reverse unit 40 calculates the target trajectory or angle correction by determining a difference between the angle $\theta$ between the vehicle 10 and the trailer 80 detected at the time of the user input.

In some embodiments, the knob 23 is also movable along the knob axis between an advanced position x1 (FIG. 3) and a retracted position x2 (FIG. 4), providing additional functionality to the knob 23. For example, the position sensor 29 determines an axial position of the knob 23, and the trailer reversing assist unit 40 interprets the output signal based on the knob axial position.

In use, the knob 23 is rotatable about the knob axis between a first rotational position $\alpha 1$ and a second rotational position $\alpha 2$ (FIG. 5). In some embodiments, an amount of rotation of the knob about the knob axis is proportional to an amount of desired vehicle steering angle change to achieve a new angle $\theta$ between the vehicle 10 and the trailer 80 relative to a current angle $\theta$ between the vehicle 10 and the trailer 80.

In some embodiments, when the knob 23 is in the first axial position x1 it is free to rotate about the knob axis 28 and angle corrections can be input into the trailer reversing assist unit 40, and when the knob 23 is in the second axial position x2 it is prevented from rotation about the knob axis 23, and no angle corrections can be input into the trailer reversing assist units. In this embodiment, the knob 23 provides a lock-out function that prevents further input of angle corrections.

In some embodiments, when the knob 23 is in the first axial position x1, an output signal corresponding to the amount of rotation of the knob has a first sensitivity (e.g., signal gain). In addition, when the knob 23 is in the second axial position x2, an output signal corresponding to the amount of rotation of the knob 23 has a second sensitivity. In this embodiment, the second gain is different from the first gain.

In some embodiments, when the knob 23 is in the first axial position x1 and rotates about the knob axis 28, the knob provides a first output signal corresponding to the rotation of the knob about the knob axis. In addition, when the knob 23 is in the second axial position x2 and rotates about the knob axis 28, the knob 23 provides a second output signal corresponding to the rotation of the knob 23 about the knob axis 28. In this embodiment, the first output signal affects control of a first function of the system (for example, providing an amount of desired angle change to be output to the trailer reversing assist unit 40), and the second output signal affects control of a second function of the system (for example, selecting what information such as camera views, type of overlays used, etc.) is displayed on the display unit, where the first function is different from the second function.

The display device 30 allows presentation of information and status to a user of the vehicle 10. In some embodiments, the display device 30 may display video or images captured by the camera 60. As a consequence, the HMI unit 20 may assist a driver by providing a rear view from the vehicle 10 that includes the trailer 80. The display device 30 may also include graphical indicators including guidelines, path of travel indicators, warnings, and the like that are generated by the camera 60, by another camera or detector such as a trailer mounted camera or the trailer reverse assist unit 40.

Figure 6:
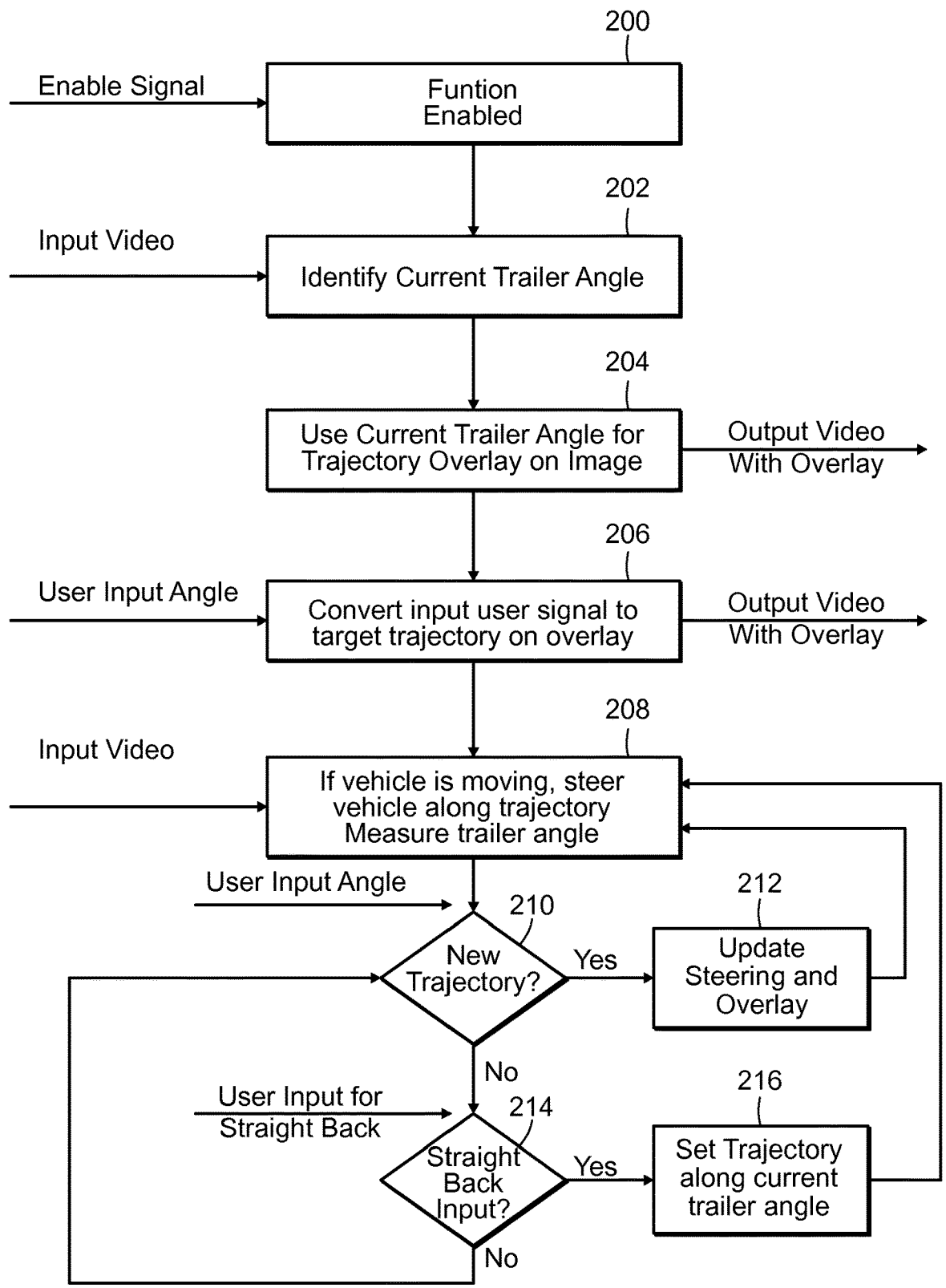
FIG. 6 is a flow chart illustrating the function of the trailer reversing assist system according to one embodiment.

FIG. 6 illustrates a flowchart of a method of operating the trailer reversing assist system 15 according to one embodiment. In the illustrative embodiment of FIG. 3, the vehicle reversing assist function may be initiated by the user via the HMI device 22. Upon initiation by the user, an enablement signal is received by the function control module 46 (block 200).

At this time, the trailer angle detection module 50 receives a signal from the camera 60 representative of an area behind the vehicle 10 (block 202). In some embodiments, the camera 60 captures an image including a rear portion of the vehicle 10, the area behind the vehicle 10, and objects behind the vehicle 10 including the trailer 80.

The function control module 50 provides an image to the display device 30. In some embodiments, the trailer angle detection module 50 may transform the signal from the camera 60 to a top-down image of the area behind the vehicle 10 and output the image to the display unit 30. In other embodiments, the trailer angle detection module 50 provides the camera view as seen by the camera 60 to the display unit 30. The display unit 30 may include an overlay that illustrates the current trailer angle θ (block 204).

The angles and trajectories selected by the user using the HMI device 22 can be displayed in a variety of ways. These include being shown as a graphic on an image of a model of the vehicle and trailer; or as an overlay on the image from a rear view camera, side view camera or combination of those such as in a 2-D or 3-D surround view image. Additionally, the image shown could be the full fisheye image of the cameras or a perspective view image of the region around the desired trailer trajectory. In cases where the trajectory in the rear view image would be blocked by the trailer, it is possible to show the trajectory as a transparent overlay on the trailer image with the ground region behind the trailer indicated as a mesh or grid of points.

Based on the information provided in the image shown on the display device 30, the user may provide input, for example an input angle, via the HMI device 22. The input may correspond to a target trailer trajectory that positions the trailer 80 at a target location or to a trailer trajectory correction. The function control module 50 converts the user input to a target trajectory overlay that represents a target trajectory, and outputs the target trajectory overlay to the display device 30 (block 206).

The function control module 50 and steering angle calculation module 48 each provide operating instructions to various vehicle systems including the engine torque controller 66 and power steering controller 68, and the vehicle proceeds with a reversing operation in accordance with the target trajectory (block 208), whereby the vehicle is steered along the target trajectory.

During the reversing operation, the trailer angle detection module continuously detects and calculates the trailer angle θ. This information is output to the display device 30. The user is able to view the current trailer angle θ as well as the target trajectory on the display device 30.

Based on the information provided by the display device 30, the user may operate the HMI device 22 to provide a correction to the vehicle trajectory. The steering angle control module 48 receives the input from the HMI device 22, and determines whether a new trajectory is required (block 210).

If a new trajectory is required, the steering angle calculation module 48 calculates a new target trajectory, and outputs this information to the function control module 50. The function control module 50 and steering angle calculation module 48 each provide updated operating instructions to various vehicle systems including the engine torque controller 66 and power steering controller 68 (block 212). Then, the vehicle proceeds with a reversing operation in accordance with the new target trajectory (block 208), and updated information is provided to the display unit 30.

If a new trajectory is not required, the steering angle control module 48 determines whether the user is requesting, via the HMI device 22, a straight back trajectory (e.g., a trajectory in which the angle θ is zero) (block 214).

If the user has requested a straight back trajectory, a new trajectory is set corresponding to the current trailer angle θ, and the steering control module 48 outputs this information to the function control module 50 (block 216). The function control module 50 and steering angle calculation module 48 each provide updated operating instructions to various vehicle systems including the engine torque controller 66 and power steering controller 68, the vehicle proceeds with a reversing operation in accordance with the new target trajectory (block 208), and updated information is provided to the display unit 30.

If the user has not requested a straight back trajectory, the steering control module 48 does not calculate a new target trajectory, and the function control module 50 and steering angle calculation module 48 each provide operating instructions to the various vehicle systems to maintain a reversing path that follows the target trajectory, and control is returned to block 210 where the system monitors for a change in trajectory. This process is continued until the trailer 80 has reached the target location.

The trailer reversing assist unit 40 may include one or more features, outlined in the following examples, that further improve operation the trailer reversing assist system 15, and thus provide an improve user experience.

In one example, in some embodiments, the trailer reversing assist system 15 is configured to steer the trailer to the aligned direction on the ground and also align the vehicle 10 with the trailer 80 along the same path. In this example, the trailer reversing assist unit 40 may be configured to set a target trailer trajectory based on a ground based reference direction and a detected angle of the trailer relative to the vehicle. The trailer reversing assist unit 40 then controls the vehicle movement so as to steer the trailer 80 to move along a path corresponding to the target trailer trajectory, and align the vehicle 10 with the trailer 80 along the target trailer trajectory. In this embodiment, the ground based reference direction is set based on an input from the HMI device 22. In addition, an overlay is provided on an image displayed on display device 30. The image is provided by a vehicle camera 60, where the vehicle camera 60 is a calibrated camera that can provide target trajectory, the vehicle position, and the trailer position in world coordinates such that as the vehicle is reversed, the system calculates the angles of both the trailer and the vehicle relative to the target trajectory.

In another example, the trailer reversing assist system 15 may be configured to produce motion along a fixed radius of curvature. In this example, the trailer reversing assist unit 40 may be configured to set a desired trailer trajectory based on a fixed trailer angle relative to the vehicle.

In another example, the trailer reversing assist system 15 may be configured to drive the vehicle and trailer to achieve a requested position and orientation. In this example, the trailer reversing assist unit 40 may include a controller that is configured to set a desired end position and trailer orientation at some position on the ground.

In another example, the trailer reversing assist system 15 may be configured to dynamically steer the trailer, and when the system 15 has achieved a desired direction, to then align the vehicle and trailer along that direction. In this example, the HMI device 22 supports a single operation of the HMI device 22, such as pressing a knob or a button, to indicate the current trailer direction as the desired direction. The trailer reversing assist unit 40 includes a controller that is configured to then change the steering control to align the vehicle and trailer along the current trailer direction.

In another example, the trailer reversing assist system 15 may be configured to avoid quickly arriving at a jack-knife position. In this example, the trailer reversing assist unit 40 includes a controller that is configured to limit the speed of the vehicle.

In another example, the trailer reversing assist system 15 may be configured to adjust the sensitivity of the user input to compensate for a potential for jack-knifing the trailer 80. In this example, the trailer reversing assist unit 40 includes a controller that is configured to automatically set the sensitivity of the user input (the mapping of input motion to desired trailer angle) based on a potential for jack-knifing the trailer. For example, shorter trailers have a smaller jack-knife angle. So the maximum range of user input could map to this smaller jack-knife angle as compared to the angle range which would be allowed for a longer trailer.

In some embodiments, the effect of trailer length on jack-knifing can be used to determine a sensitivity of the user input. This is because the trailer length affects a potential for Jack-knifing, where a shorter trailer has a smaller jack-knife angle. Thus, the sensitivity of the user input can be set to be proportional to a ratio of the actual trailer length to a reference trailer length. The reference trailer length can be an average trailer length.

In some embodiments, the effect of vehicle speed can be used to determine a sensitivity of the user input. This is because vehicle speed affects a potential for jack-knifing, where a faster vehicle speed corresponds to a shorter time to achieve a jack-knife angle. Thus, at higher speeds the sensitivity of the user input to trailer angle is reduced relative to a reference sensitivity, since at higher speeds, the time to jack-knife the trailer is shorter.

In some embodiments, the input sensitivity is set based on both the trailer length and vehicle speed.

In some embodiments, a jackknife angle is calculated based on at least one of a trailer length and a vehicle speed, and the user input sensitivity is set based on a ratio of the measured angle θ between the vehicle 10 and the trailer 80 and the jackknife angle.

In another example, the trailer reversing assist system 15 may be configured to limit the magnitude of the selected trailer angle, which is beneficial for instances where trailer motion is limited and/or travel distance is relatively short. In this example, the trailer reversing assist unit 40 includes a controller that is configured to limit the selected trailer angle to avoid the jack-knife condition, but allow for an override to go past the jack-knife angle based on an additional user input or action.

Thus, embodiments of the invention provide, among other things, a trailer reversing assist system 15 and method for operating a vehicle equipped with the trailer reversing assist system 15. The trailer reversing assist system 15 and associated methods determine a target trajectory of the trailer based on a user input via the HMI device 22, and perform an automated vehicle maneuver based on the target trajectory.

As an example of HMI unit 20 supporting the trailer reversing assist system 15, a continuously rotatable knob 23 is described that also supports a push button action, including how the knob 23 can be used to achieve the above described user interface.

Figure 7:
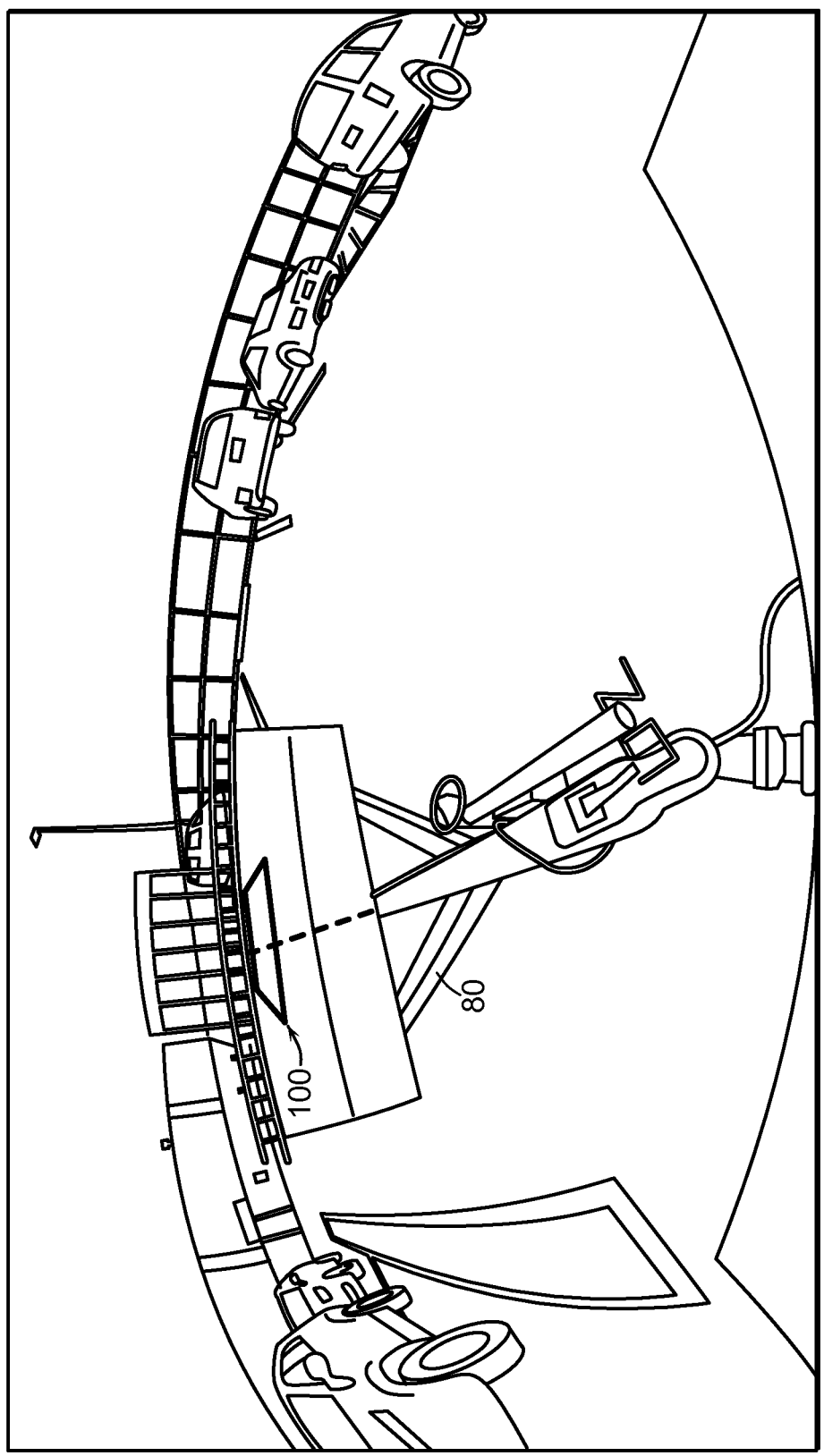
FIG. 7 represents a display device image showing a camera view illustrating a rear view of the vehicle including the trailer and a first configuration of an overlay.
Figure 8:
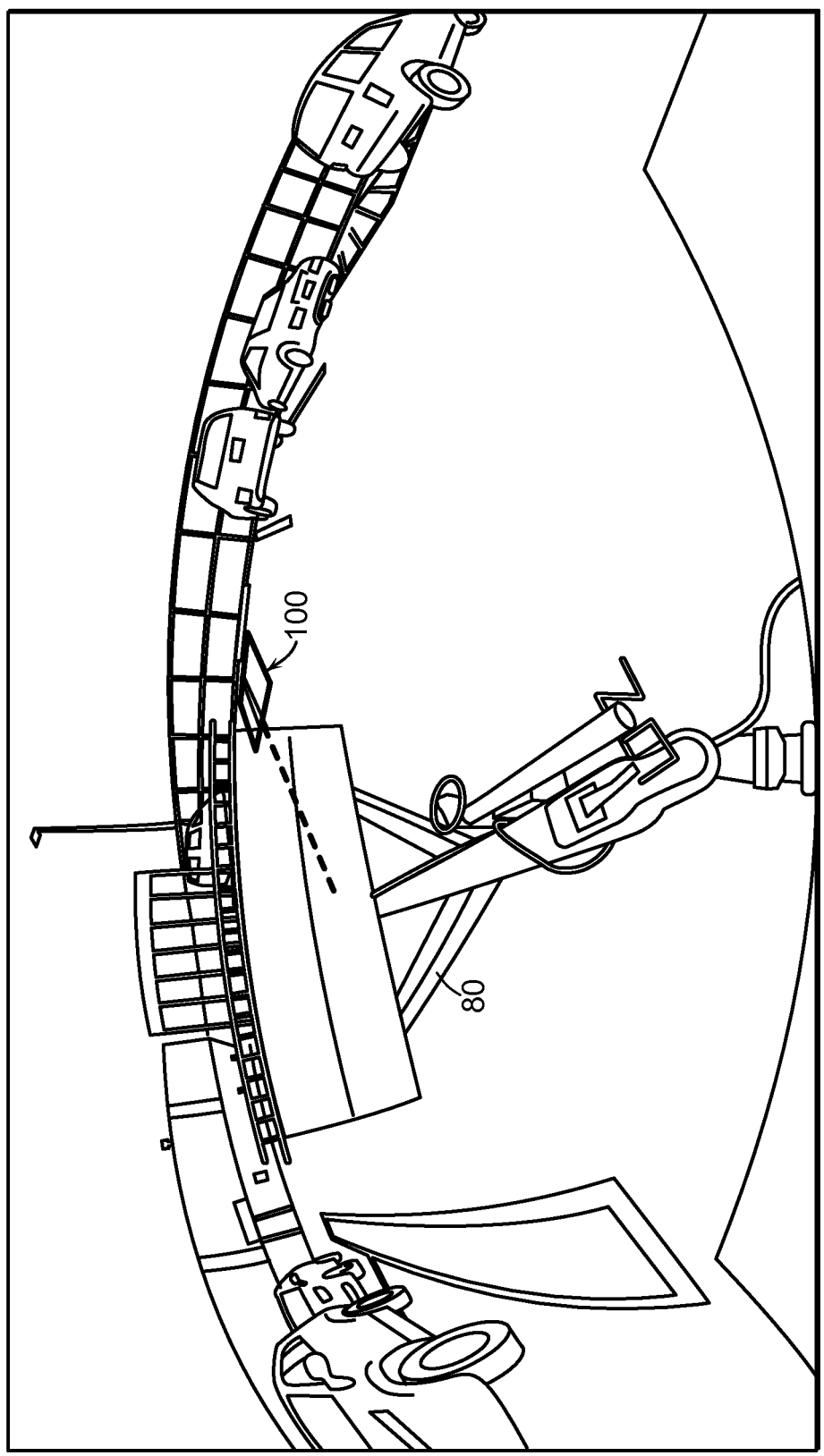
FIG. 8 represents a display device image showing a camera view illustrating a rear view of the vehicle including the trailer and a second configuration of an overlay.

Referring to FIGS. 7 and 8, at the start of using the function, the overlay 100 (shown in heavy lines) shows the current alignment of the trailer 80 as the selected angle or direction for the trailer 80 to travel (FIG. 7). It can also optionally show, with a semi-transparent overlay, a potential end point or parking spot for the trailer 80, as also illustrated in the figure. By using a knob 23 or other input device, the selected direction and/or parking spot can be selected and shown to the user via an overlay 100 (shown in heavy lines) on the rear camera image (FIG. 8). The vehicle 10 would then maneuver to achieve that trailer direction. While maneuvering, the user would have the option of additionally correcting the direction by moving the knob 23. The rotation of the knob 23 would be interpreted as a change relative to the current trailer direction and not based on any absolute rotational position of the knob 23.

Another use case is continuous control of the trailer direction via user input. As shown in FIG. 7, the starting trailer position would be the selected direction. Based on turning a knob 23 or other motion sensing input device, a new direction for the trailer 80 can be indicated. This direction can be continuously updated by the user when reversing. When achieving a trailer direction that is desired, pressing on the knob 23, or alternatively, no longer rotating the knob 23, would fix the current trailer direction as the desired direction.

In the illustrated embodiment, the HMI device 22 is a continuously rotatable knob that is mounted within the vehicle 10. However, the HMI device is not limited to having a knob configuration. For example, the HMI device 22 may alternatively be, and/or also include other devices that can be manipulated by the user to provide input to the system 15. Alternative embodiment HMI devices will now be described. In these embodiments, the trailer reversing assist system 15 may send vehicle-related information to the display 30 and receive user-selected instructions from the HMI device 22 relating to control of the vehicle 10.

In one example, an alternative embodiment HMI unit is a knob that functions as a joystick. In this example, the knob is rotatable about a transverse axis that is transverse to the knob axis 28 and passes through the knob second end 27. When the joystick rotates about the knob axis, the joystick provides a first output signal corresponding to the rotation of the joystick about the knob axis 28, and when the joystick rotates about the transverse axis, the joystick provides a second output signal corresponding to the rotation of the joystick about the transverse axis. In this case, the first output signal affects control of a first function of the system, and the second output signal affects control of a second function of the system, where the first function is different from the second function.

In another example, an alternative embodiment HMI unit is a knob that translates within a slot and functions as a slider switch. In this example, the knob is linearly movable along a slide axis that is non-parallel to the knob axis between a first location and a second location that is spaced apart from the first location. The amount of translation of the knob corresponds to an amount of angle change, and the direction of movement of the knob within the slot corresponds to a direction of angle change.

In another example, an alternative embodiment HMI unit is a knob that translates within a slot and functions as a slider switch and is also axially movable along the knob axis between a first axial position x1 and a second axial position x2. When the knob is in the first axial position and moves along the slide axis, the knob provides a first output signal corresponding to a position of the knob along the slide axis.

In addition, when the knob is in the second axial position and moves along the slide axis, the knob provides a second output signal corresponding to a position of the knob along the slide axis. In this case, the first output signal affects control of a first function of the system, and the second output signal affects control of a second function of the system, where the first function is different from the second function.

In another example, an alternative embodiment HMI unit includes at least one push button, wherein operation of the push button results in an output signal corresponding to a desired movement direction and duration of operation of the push button corresponds to a magnitude of operation. In one embodiment, the HMI device includes five push buttons. Four of the five push buttons are configured to provide an output signal corresponding to a desired movement direction, where each of the four push buttons corresponds to a unique direction. The fifth push button of the five push buttons provides an output signal that is not related to a movement direction. For example, the fifth button may provide a locking function such that when pressed, the current selection remains in place until the fifth button is pressed again to release the locking function.

In another example, an alternative embodiment HMI unit is a rocker switch.

In another example, an alternative embodiment HMI unit is a touch pad.

In another example, an alternative embodiment HMI unit includes a touch screen within the vehicle 10 that serves as the display unit 30 as well as the HMI device 22.

In the illustrated embodiment, the HMI device 22 is internally located within the vehicle 10. However, the HMI device 22 and/or the HMI unit 20 are not limited to being internally located. For example, in some embodiments, the HMI unit 20 including the HMI device 22 is externally located from the vehicle 10 and is configured to provide remote monitoring and control of the vehicle 10 by the user. For example, the HMI unit 20 may be a mobile device (for example, a mobile phone, a laptop, a tablet, and the like) communicatively coupled to the vehicle 10 via a wireless connection (for example, Wi-Fi, Bluetooth, and the like). In this case, HMI unit 20 includes an application stored on a mobile computing device and a touch screen of the mobile computing device provides the display device 30.

The trailer reversing assist system 15 described herein includes a plurality of electrical and electronic components that provide power, operational control, and protection to the components and modules within the trailer reversing assist system 15. The trailer reversing assist system 15 includes the modules 46, 48, 50 that each include, among other things, an electronic processor (such as a programmable electronic microprocessor, microcontroller, or similar device), a memory (for example, non-transitory, machine readable memory) and application specific integrated circuits (ASICs) for handling input/output functions, processing of signals, and application of the methods listed above. In other embodiments, the trailer reversing assist system 15 includes additional, fewer, or different components. In addition, the trailer reversing assist system 15 may be implemented in several independent controllers (for example, electronic control units) each configured to perform specific functions or sub-functions.

A plurality of hardware and software based devices, as well as a plurality of different structural components may be used to implement embodiments discussed herein. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (for example, stored on non-transitory computer-readable medium) executable by one or more processors. As such, a plurality of hardware and software based devices, as well as a plurality of different structural components may be utilized to implement various embodiments. For example, "control units" and "controllers" described in the specification can include one or more processors, one or more memory modules including non-transitory computer-readable medium, one or more input/output interfaces, and various connections (for example, a system bus) connecting the components.

Various features and advantages of the invention are set forth in the following claims.

We claim:

1. A trailer reversing assist system for controlling reversing operations of a vehicle and trailer connected to the vehicle, the system comprising
a trailer angle detection module that detects an angle of the trailer relative to the vehicle, and outputs a trailer angle signal corresponding to the detected angle,
a human machine interface (HMI) device that provides an interface between a vehicle operator and the system, the HMI device providing an output signal based upon an operation of the HMI device by the user, where the generated output signal includes information regarding a magnitude and a direction of the operation of the HMI device by the user, and the output signal corresponds to at least one of a desired target trajectory and desired trailer trajectory correction, and
a controller that
receives as inputs the output signal and the trailer angle signal generated at the time of operation of the HMI device by the user,
performs at least one of a) a calculation of a trailer trajectory that positions the trailer at a target location and b) a calculation of a trailer trajectory correction, wherein the calculation is performed using the output signal as corresponding to a change relative to the detected angle, and the detected angle corresponds to the trailer angle signal generated at the time of operation of the HMI device by the user, and
controls a steering angle of the vehicle of the vehicle to position the trailer at the target location based on the trailer trajectory,
wherein
the HMI device is a continuously rotatable knob that has a first end, a second end opposed to the first end, and a knob axis that extends between the first end and the second end, the knob axis corresponds to an axis of rotation of the knob, and
an amount of rotation of the knob about the knob axis is proportional to an amount of vehicle steering angle change relative to a current vehicle steering angle.

2. The trailer reversing assist system of claim 1, wherein the knob is rotatable about the knob axis between a first rotational position and a second rotational position, and the knob is free of a bias to any given mob rotational position.

3. The trailer reversing assist system of claim 1, wherein the knob is moveable along the knob axis between a first axial position and a second axial position, wherein when the knob is in the first axial position it is free to rotate about the knob axis, and when the knob is in the second axial position it is prevented from rotation about the knob axis.

4. The trailer reversing assist system of claim 1, wherein the knob is moveable along the knob axis between a first axial position and a second axial. position,
when the knob is in the first axial position, an output signal corresponding to the amount of rotation of the knob has a first gain, and
when the knob is in the second axial position, an output signal corresponding to the amount of rotation of the knob has a second gain, and the second gain is different from the first gain.

5. The trailer reversing assist system of claim 1, wherein the knob is moveable along the knob axis between a first axial position and a second axial position,
when the knob is in the first axial position and rotates about the knob axis, the knob provides a first output signal corresponding to the rotation of the knob about the knob axis,
when the knob is in the second axial position and rotates about the knob axis, the knob provides a second output signal corresponding to the rotation of the knob about the knob axis,
the first output signal affects control of a first function of the system, and
the second output signal affects control of a second function of the system, where the first function is different from the second function.

6. The trailer reversing assist system of claim 1, wherein the knob is rotatable about a transverse axis that is transverse to the knob axis and passes through the knob second end,
when the knob rotates about the knob axis, the knob provides a first output signal corresponding to the rotation of the knob about the knob axis,
when the knob rotates about the transverse axis, the knob provides a second output signal corresponding to the rotation of the knob about the transverse axis,
the first output signal affects control of a first function of the system, and
the second output signal affects control of a second function of the system, where the first function is different from the second function.

7. The trailer reversing assist system of claim 1, wherein the HMI device is a knob that has a first end, a second end opposed to the first end, and a knob axis that extends between the first end and the second end,
the knob is linearly movable along a slide axis that is non-parallel to the knob axis between a first location and a second location that is spaced apart from the first location.

8. The trailer reversing assist system of claim 7, wherein the knob is moveable along the knob axis between a first axial position and a second axial position,
when the knob is in the first axial position and moves along the slide axis, the knob provides a first output signal corresponding to a position of the knob along the slide axis,
when the knob is in the second axial position and moves along the slide axis, the knob provides a second output signal corresponding to a position of the knob along the slide axis,
the first output signal affects control of a first function of the system, and
the second output signal affects control of a second function of the system, where the first function is different from the second function.

9. The trailer reversing assist system of claim 1, wherein the HMI device comprises at least one push button, wherein operation of the push button results in an output signal corresponding to a desired movement direction and duration of operation of the push button corresponds to a magnitude of operation.

10. The trailer reversing system of claim 9, wherein the HMI device comprises five push buttons and four of the five push buttons are configured to provide an output signal corresponding to a desired movement direction, each push button provides an output signal corresponding to a unique movement direction, and the fifth push button of the five push buttons provides an output signal that is not related to a movement direction.

11. The trailer reversing assist system of claim 1, wherein the HMI device comprises a rocker switch.

12. The trailer reversing assist system of claim 1, wherein the HMI device comprises touch pad.

13. The trailer reversing assist system of claim 1, wherein the system comprises a vehicle camera and a display screen that displays images provided by the vehicle camera, and wherein the display screen is a touch screen that serves as the HMI device.

14. The trailer reversing assist system of claim 1, wherein the controller is located within the vehicle, and HMI device wirelessly communicates with the controller.

15. The trailer reversing assist system of claim 1, wherein the HMI device includes an application stored on a mobile computing device and a touch screen of the mobile computing device.

* * * * *